ized to install underground metal pipes in circumstances where it is desirable to permit soil to flow into the interior chamber of the pipe as said pipe is being pulled into its underground installed position. A main sleeve portion of the plastic pipe connector is exteriorly screwthreaded along a front end portion for threaded engagement within an annular tube portion of the metal pipe connector, and a pair of relatively short sleeves of predetermined differing diameters are fixed as by welding relative to respective inner and outer rear end surfaces of the main sleeve portion. Rearwardly extended portions of the short sleeves define an annular pocket sized to receive a leading end of the plastic pipe. A plurality of circumferentially spaced apart screws are radially engaged through the short sleeves and the plastic pipe lead end, engaged in the annular pocket.

5 Claims, 3 Drawing Figures

United States Patent [19]
Schosek

[11] 4,318,639
[45] Mar. 9, 1982

[54] CONNECTOR FITTING FOR USE IN INSTALLING UNDERGROUND PLASTIC PIPES

[76] Inventor: William O. Schosek, 7942 Marx Dr., North Fort Myers, Fla. 33903

[21] Appl. No.: 149,173

[22] Filed: May 12, 1980

[51] Int. Cl.³ .............................................. F16L 1/02
[52] U.S. Cl. ................................. 405/184; 285/242; 285/331; 285/404
[58] Field of Search .................. 285/331, 404, 242; 405/184; 175/62, 53

[56] References Cited

U.S. PATENT DOCUMENTS

| | | | |
|---|---|---|---|
| 621,282 | 3/1899 | Pugh | 285/404 X |
| 679,399 | 7/1901 | Smith et al. | 285/331 |
| 910,885 | 1/1909 | Waitz | 285/404 X |
| 1,831,856 | 11/1931 | Fullman | 285/404 |
| 3,514,132 | 5/1970 | Peabody | 285/404 X |
| 3,589,135 | 6/1971 | Ede | 405/184 |
| 4,117,895 | 10/1978 | Ward et al. | 405/184 X |

FOREIGN PATENT DOCUMENTS 6146 of 1912 United Kingdom ................ 285/404

Primary Examiner—Thomas F. Callaghan
Attorney, Agent, or Firm—Alfred E. Wilson

[57] ABSTRACT

A connector fitting, for use in the installation of underground plastic pipes, for threaded engagement into a generally standard fitting conventionally used to install underground metal pipes in circumstances where it is U.S. Patent   Mar. 9, 1982   4,318,639

CONNECTOR FITTING FOR USE IN INSTALLING UNDERGROUND PLASTIC PIPES

BACKGROUND OF THE PRESENT INVENTION

It often becomes necessary to install a pipe under an existing driveway or street, for example. Appropriate underground pipe installers are provided for this purpose, and an operating trench is provided on one side of the street or driveway for the installer device and a target trench is provided on the other side. A rod assembly, comprised of coupled rod sections, is driven by the installer device through the soil until a leading end thereof emerges into the target trench. A pipe connector fitting is then screwthreaded onto the tip end of the rod assembly, and with a pipe attached thereto the direction of operation of the installer device is reversed to pull the pipe backwardly into an installed position within the hole formed by the rod.

Often the pipe is greater in diameter than the hole forming rod so the pipe connector fitting includes an enlarged hole expander portion. Other problems are inherent with the pipe installing operation, for example, the soil may be very firm and well compacted, and when the hole is enlarged by means of a hole expander, an above road or driveway pavement, for example, may be buckled upwardly. To obviate this contingency, a generally tubular type of pipe connector fitting is utilized which permits the soil to flow into the pipe itself as it is withdrawn through the soil, and after the pipe is installed the soil is removed from the pipe by means of an elongated augar means. This is a standard practice.

The tubular pipe connector is interiorly screwthreaded to receive the screwthreaded end of a metal pipe for the installation operation. However, plastic pipes are being increasingly utilized, pipes of this nature such as PVC pipes are adhesively coupled and are not screwthreaded and cannot be secured by the interior screwthreads of the metal pipe connector.

Therefore, one of the principal objects of the present invention is to provide a pipe connector means for threaded engagement within a conventional pipe connector fitting of the aforementioned type, the pipe connector means including inner and outer rearwardly extended sleeves in a radially spaced apart relation and a plurality of circumferally spaced apart lock bolts to secure an end portion of a plastic pipe in a pocket defined between the inner and outer sleeves.

Another object of the present invention is to provide each lock bolt with a sharpened annular leading end to automatically form holes through the plastic pipe leading end as the bolt is being threaded into a locked position.

DESCRIPTION OF A PREFERRED EMBODIMENT

Figure 1:
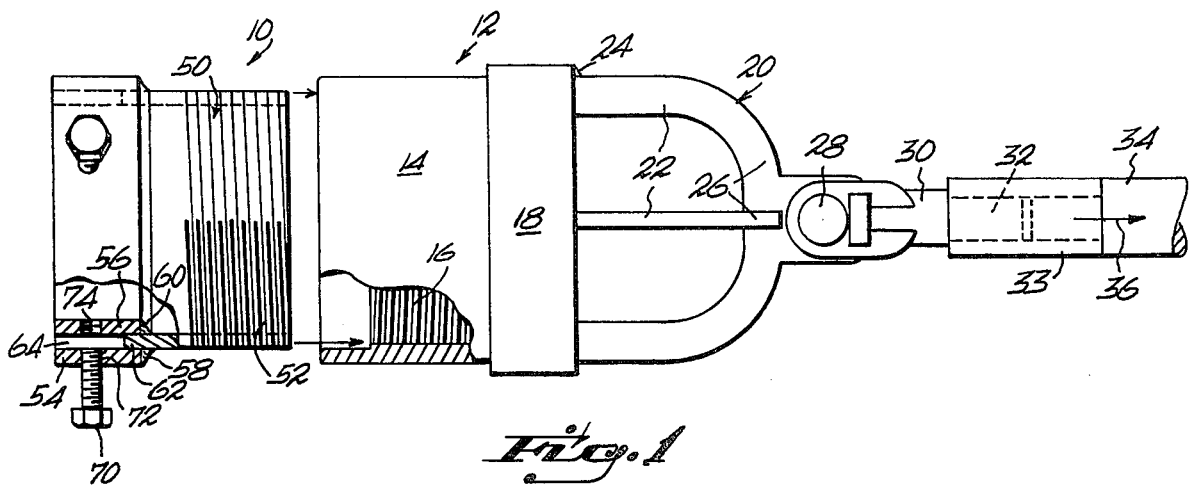
FIG. 1 is an elevational view of the plastic pipe connector fitting of the present invention in an exploded relation to a standard metal pipe connector device, parts being broken away to illustrate various structural details.

With reference to the drawings, and particularly to FIG. 1, the plastic pipe connector of the present invention, designated generally at 10 is spaced rearwardly of a standard metal pipe connector 12.

Referring, first, to the metal pipe connector 12, a main tubular body portion 14 is provided with interior screwthreads 16 and an exterior stiffening collar 18 about its forward end. A generally forwardly extending spider 20, comprised of a plurality of spaced apart legs 22, is fixed at its rear end as by welding 24 to the forward periphery of the tubular body portion 14 and collar 18. Inwardly turned nose ends 26 of legs 22 are pivotally connected at 28 to a short stub rod 3 including a threaded stud 32 for coupled connection at 33 to the distal end 34 of an underground hole forming rod assembly.

In a conventional operation of installing a metal pipe, the end of a metal pipe is threaded into interior threads 16 and the installer device (not shown) is actuated to pull the distal end 34, as part of the rod assembly, in the direction of arrow 36. It can be seen that, because of the open nature of metal pipe connector 12, soil will be caused to flow into the interior of connector 12, as well as a metal pipe (not shown) connected thereto, as indicated by arrows 38, FIG. 2.

The connector 10 includes a main tubular length 50, including exterior screwthreads 52, for engagement in screwthreads 16 within tubular body portion 14.

Figure 2:
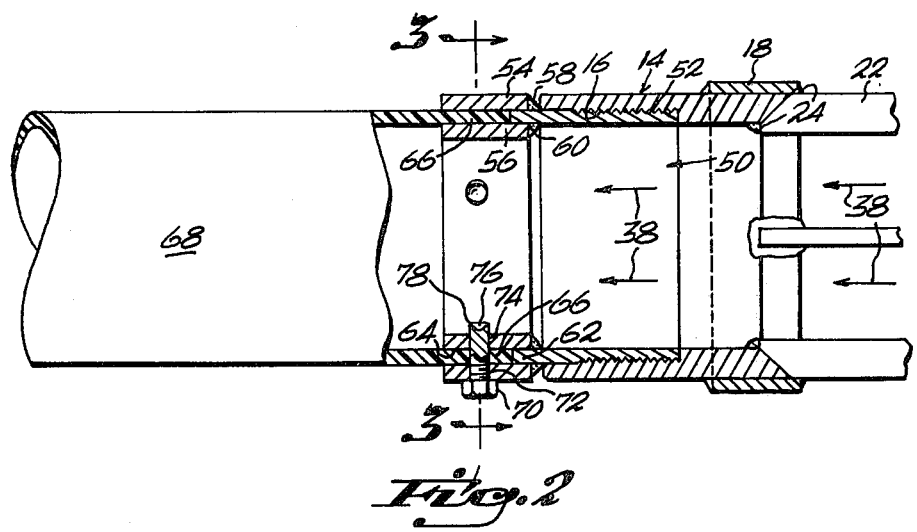
FIG. 2 is a view similar to FIG. 1, and partially is cross section, illustrating the plastic pipe connector engaged in the metal pipe connector and locked relative to a plastic pipe end portion.
Figure 3:
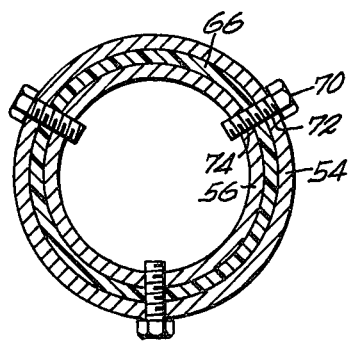
FIG. 3 is a vertical cross section taken along line 3—3 of FIG. 2.

A pair of relatively short sleeves 54, 56 are fixed as by welding 58, 60 relative to respective outer and inner surfaces of a trailing end portion 62 of tubular length 50 to define an annular pocket 64 between rearward extension portions of sleeves 54, 56 to receive a leading end portion 66, FIGS. 2 and 3, of a plastic pipe 68.

A plurality of lock bolts 70, three illustrated, are threaded through radially aligned threaded holes 72, 74 in sleeves 54, 56. As illustrated in FIG. 2, the inner end of each lock bolt 70 is provided with a concavity 76 to define a peripheral cutting edge 78. Therefore, the ends of plastic pipe 68 need not be pre-drilled. Because of the aligned nature of sleeve holes 72, 74 and the peripheral cutting edge 78, the insertion operation of lock bolts 70 cuts and removes plugs from the plastic pipe portion 66.

It should be noted particularly that the arrangement of sleeves 54, 56 relative to trailing end portion 62 of main tubular length 50 permit the connector 10 to receive the same diameter plastic pipe as the diameter of metal pipe received in metal pipe connector 12. For example, if connector 12 receives 4 inch I.D. metal pipe, the connector 10 will receive a 4 inch I.D. plastic pipe. The soil will also flow or be moved into the plastic pipe as indicated by arrows 38.

It should also be recognized that the spider means 20 and pivotal connection to a coupling carried by a hole forming rod assembly 34 may be applied directly to connector 10. However, as a person engaged in the business of installing underground pipes would normally have a plurality of couplers to engage with various sized pipe, it would be far less costly, and space consuming to adapt each of his existing metal pipe couplers for use in installing plastic pipes.

I claim:

1. A fitting for connecting a length of plastic pipe to a distal end of a coupled underground hole forming rod assembly when the rod assembly is positioned underground with the distal end positioned in a target trench, the fitting comprising a main metal sleeve portion of a predetermined length, thickness and diameter, a pair of axially aligned relatively short metal sleeves of predetermined differing diameters for fixed attachment, as by welding, relative to respective inner and outer rear end surface portions of said main sleeve portion, said pair including rearwardly extended portions defining a rearwardly opening annular pocket, sized to receive a leading end portion of the length of plastic pipe; lock bolt means, threadedly engaged through said extended portions in positions to engage through said plastic pipe leading end within said pocket, and means to connect a forward end of said main sleeve portion to the distal end of the rod assembly.

2. The fitting as defined in claim 1 wherein said lock bolt means comprises a plurality of radially spaced apart lock bolts, each of which is threaded through a pair of axially aligned threaded holes in said extended portions and said plastic pipe leading end.

3. The fitting as defined in claim 2 wherein a leading end of each lock bolt is provided with an axially extending concavity, defining a sharp annular leading end cutting edge.

4. The fitting as defined in claim 1 wherein said means to connect includes a generally forwardly extending spider pivotally connected at a forward end to a stub rod, coupled to the distal end of the hole forming rod assembly.

5. The fitting as defined in claim 4 wherein a forward exterior end portion of said main sleeve portion is screwthreaded for engagement within an interior screwthreaded portion of a connector sleeve, fixed as by welding to a rear end portion of said spider.

* * * * *